US012553932B2

(12) United States Patent
Chan et al.

(10) Patent No.: US 12,553,932 B2
(45) Date of Patent: Feb. 17, 2026

(54) DETECTION CIRCUIT AND METHOD FOR DETECTING CHANGE IN OUTPUT IMPEDANCE OF TRANSMITTING CIRCUIT (71) Applicant: MEDIATEK INC., Hsin-Chu (TW)

(72) Inventors: Wei-Chia Chan, Hsinchu (TW); Hui-Hsien Liu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 228 days.

(21) Appl. No.: 18/419,580

(22) Filed: Jan. 23, 2024

(65) Prior Publication Data
US 2024/0345147 A1    Oct. 17, 2024

Related U.S. Application Data (60) Provisional application No. 63/496,436, filed on Apr. 17, 2023.

(51) Int. Cl.
*G01R 27/26* (2006.01)
*G01R 27/02* (2006.01)
*G01R 31/36* (2020.01)
*G01R 31/389* (2019.01)

(52) U.S. Cl.
CPC ............. *G01R 27/26* (2013.01); *G01R 27/02* (2013.01); *G01R 31/389* (2019.01)

(58) Field of Classification Search
CPC ........ G01R 27/00; G01R 27/02; G01R 27/16; G01R 27/26; G01R 31/00; G01R 31/36; G01R 31/389
USPC ................................................... 324/600, 612
See application file for complete search history.

(56) References Cited

U.S. PATENT DOCUMENTS

| 10,171,115 | B1 * | 1/2019 | Shirinfar | ................ | H04B 17/12 |
| 10,177,828 | B2 * | 1/2019 | Sridharan | ............ | H04B 7/0656 |
| 10,530,401 | B2 * | 1/2020 | Shirinfar | .............. | H04B 1/0475 |
| 10,917,126 | B2 * | 2/2021 | Shirinfar | .............. | H04B 1/0475 |
| 2010/0321086 | A1 | 12/2010 | See | | |
| 2020/0083916 | A1 | 3/2020 | Shirinfar | | |

* cited by examiner

*Primary Examiner* — Hoai-An D. Nguyen
(74) *Attorney, Agent, or Firm* — Winston Hsu (57) ABSTRACT A detection circuit and a method for detecting a change in an output impedance of a transmitting circuit are provided. The detection circuit includes at least one transmitted signal strength indicator (TSSI) circuit and a controller, wherein the controller is coupled to the at least one TSSI circuit. The at least one TSSI circuit is configured to generate a first TSSI result of the transmitting circuit according to a first phase shift and generate a second TSSI result of the transmitting circuit according to a second phase shift. The controller is configured to determine whether the change in the output impedance of the transmitting circuit is detected or not according to the first TSSI result and the second TSSI result.

20 Claims, 5 Drawing Sheets

DETECTION CIRCUIT AND METHOD FOR DETECTING CHANGE IN OUTPUT IMPEDANCE OF TRANSMITTING CIRCUIT

CROSS REFERENCE TO RELATED APPLICATIONS

This application claims the benefit of U.S. Provisional Application No. 63/496,436, filed on Apr. 17, 2023. The content of the application is incorporated herein by reference.

BACKGROUND

The present disclosure is related to output loading detection, and more particularly, to a detection circuit and a method for detecting a change in an output impedance of a transmitting circuit.

For a wireless communication device, calibration associated with linearity is typically performed under a predetermined condition. In practice, an output loading of an antenna of the wireless communication device may vary, which resulting in different nonlinear characteristics such as different amplitude-to-amplitude (AMAM) distortion and amplitude-to-phase (AMPM) distortion, and a calibration result achieved by the calibration performed under the predetermined condition is unable to make the wireless communication device achieve the same performance such as an error vector magnitude (EVM) when the output loading changes. For example, the output loading under a condition where the wireless communication device (more particularly, the antenna thereof) is held by a user can be different from that under a condition where the wireless communication device is not held by the user. Thus, if the wireless communication device is calibrated under a condition where the wireless communication device is not held by the user, a performance (e.g. the EVM) of the wireless communication device may degrade when the antenna of the wireless communication device is held by the user.

Thus, there is a need for a novel architecture and associated method, which can detect the change in the output loading and accordingly trigger re-calibration and/or associated setting adjustment.

SUMMARY

An objective of the present disclosure is to provide a detection circuit and a method for detecting a change in an output impedance of a transmitting circuit, which allows the transmitting circuit to trigger associated processing in response to the change on the output impedance, thereby preventing an overall performance such as an error vector magnitude (EVM) of the transmitting circuit from degradation.

At least one embodiment of the present disclosure provides a detection circuit for detecting a change in an output impedance of a transmitting circuit. The detection circuit comprises at least one transmitted signal strength indicator (TSSI) circuit and a controller, wherein the controller is coupled to the at least one TSSI circuit. The at least one TSSI circuit is configured to generate a first TSSI result of the transmitting circuit according to a first phase shift and generate a second TSSI result of the transmitting circuit according to a second phase shift. The controller is configured to determine whether the change in the output impedance of the transmitting circuit is detected or not according to the first TSSI result and the second TSSI result.

At least one embodiment of the present disclosure provides a method for detecting a change in an output impedance of a transmitting circuit, wherein the method is applicable to a detection circuit. The method comprises: utilizing at least one TSSI circuit of the detection circuit to generate a first TSSI result of the transmitting circuit according to a first phase shift and generate a second TSSI result of the transmitting circuit according to a second phase shift; and utilizing a controller of the detection circuit to determine whether the change in the output impedance of the transmitting circuit is detected or not according to the first TSSI result and the second TSSI result.

The detection circuit and the method provided by the embodiments of the present disclosure can detect transmitted signal strength of the transmitting circuit in at least two dimensions, which ensures that any change in the output impedance of the transmitting circuit is detectable, and allows the transmitting circuit to trigger the associated processing, in order to keep the overall performance such as the EVM. In addition, the embodiments of the present disclosure will not greatly increase additional costs. Thus, the present disclosure can solve the problem of the related art without introducing any side effect or in a way that is less likely to introduce side effects.

These and other objectives of the present disclosure will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
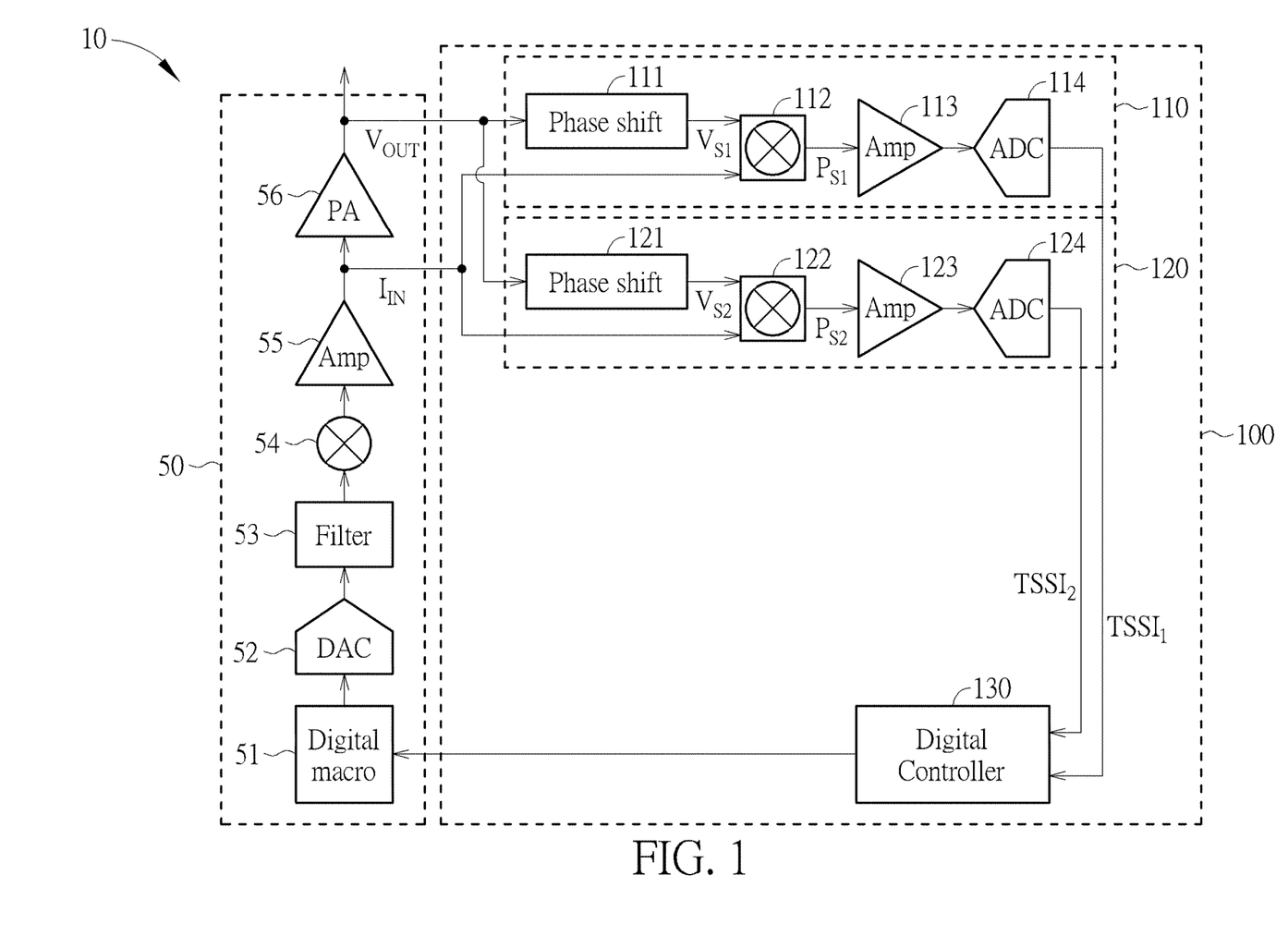
FIG. 1 is a diagram illustrating an electronic device according to an embodiment of the present disclosure.

FIG. 1 is a diagram illustrating an electronic device 10 (e.g. a wireless communication device) according to an embodiment of the present disclosure. As shown in FIG. 1, the electronic device 10 may comprise a transmitting circuit 50 and a detection circuit 100, wherein the detection circuit 100 is coupled to the transmitting circuit 50, and the detection circuit 100 is configured to detect a change in an output impedance of the transmitting circuit 50. The transmitting circuit 50 may comprise a digital processing circuit such as a digital macro 51, a digital-to-analog converter (DAC) 52, a filter 53, a mixer 54, a buffering amplifier 55 (labeled "Amp" in figures for brevity) and a power amplifier (PA) 56, wherein these components are well known by those skilled in this art, and will not be described in detail here for brevity. In some embodiments, some components (such as, filter 53 or buffering amplifier 55 or other components) of the transmitting circuit 50 could be removed. In this embodiment, the detection circuit 100 may comprise at least one transmitted signal strength indicator (TSSI) circuit and a controller such as a digital controller 130, wherein the digital controller 130 is coupled to the at least one TSSI circuit. In particular, the at least one TSSI circuit is configured to generate a first TSSI result (e.g. a TSSI result $TSSI_1$) of the transmitting circuit according to a first phase shift and generate a second TSSI result (e.g. a TSSI result $TSSI_2$) of the transmitting circuit according to a second phase shift. The digital controller 130 is configured to determine whether the change in the output impedance of the transmitting circuit is detected or not according to the first TSSI result and the second TSSI result.

In this embodiment, the at least one TSSI circuit may comprise a first TSSI circuit such as a main TSSI circuit 110 and a second TSSI circuit such as an auxiliary TSSI circuit 120, wherein both the main TSSI circuit 110 and the auxiliary TSSI circuit 120 are coupled to the digital controller 130. More particularly, the main TSSI circuit 110 is configured to generate the first TSSI result such as the TSSI result $TSSI_1$ according to the first phase shift, and the auxiliary TSSI circuit 120 is configured to generate the second TSSI result such as the TSSI result $TSSI_2$ according to the second phase shift. In detail, the main TSSI circuit 110 may comprise a phase shifting circuit 111 (labeled "Phase shift" in FIG. 1 for brevity), a multiplier 112, an amplifier 113 and an analog-to-digital converter (ADC) 114 (amplifier 113 and ADC 114 could be considered as a TSSI generate circuit), and the auxiliary TSSI circuit 120 may comprise a phase shifting circuit 121 (labeled "Phase shift" in FIG. 1 for brevity), a multiplier 122, an amplifier 123 and an ADC 124 (amplifier 123 and ADC 124 could be considered as another TSSI generate circuit). In some embodiments, some components (such as, amplifier 113 and/or amplifier 123) of the main TSSI circuit 110 and/or the auxiliary TSSI circuit 120 could be removed. In this embodiment, the phase shifting circuit 111 is configured to apply the first phase shift to an output voltage $V_{OUT}$ of the PA 56 of the transmitting circuit 50 for generating a first shifted output voltage such as a shifted output voltage $V_{S1}$, and the multiplier 112 is configured to multiply the shifted output voltage $V_{S1}$ and an input current $I_{IN}$ of the PA 56 for generating a first power signal such as a power signal $P_{S1}$, wherein the TSSI result $TSSI_1$ is generated according to the power signal Psi. For example, the power signal $P_{S1}$ may be amplified by the amplifier 113, and the ADC 114 may perform an analog-to-digital conversion upon an amplified output of the amplifier 113 for generating the TSSI result $TSSI_1$, but the present disclosure is not limited thereto. In addition, the phase shifting circuit 121 is configured to apply the second phase shift to the output voltage $V_{OUT}$ of the PA 56 of the transmitting circuit 50 for generating a second shifted output voltage such as a shifted output voltage $V_{S2}$, and the multiplier 122 is configured to multiply the shifted output voltage $V_{S2}$ and the input current $I_{IN}$ of the PA 56 for generating a second power signal such as a power signal $P_{S2}$, wherein the TSSI result $TSSI_2$ is generated according to the power signal $P_{S2}$. For example, the power signal $P_{S2}$ may be amplified by the amplifier 123, and the ADC 124 may perform the analog-to-digital conversion upon an amplified output of the amplifier 123 for generating the TSSI result $TSSI_2$, but the present disclosure is not limited thereto.

In this embodiment, when the digital controller 130 detects that a change in any of the TSSI result TSSI1 and the TSSI result TSSI2 is greater than a predetermined threshold, the digital controller 130 may determine that the change in the output impedance of the transmitting circuit 50 is detected. In some embodiments, the digital controller 130 may generate a delta TSSI result TSSIDELTA by calculating a difference between the TSSI result TSS1 and the TSSI result TSSI2 (e.g. TSSIDELTA=TSSI1−TSSI2), and when a change in any of the TSSI result TSSI1 and the delta TSSI result TSSIDELTA is greater than a predetermined threshold, the digital controller 130 may determine that the change in the output impedance of the transmitting circuit is detected. It should be noted that if the TSSI result TSSI1 (which may be regarded as a main TSSI result) or the delta TSSI result TSSIDELTA or the TSSI result TSSI2 which may be regarded as an auxiliary TSSI result is far away from an initial value (which is recorded during a previous calibration flow), it means the output impedance is far away from that under a previous calibration condition (e.g. a condition of the previous calibration flow), and an overall performance of the transmitting circuit 50 may be degraded due to a change in characteristics of the PA 56 if a re-calibration flow of the transmitting circuit 50 is not triggered. By monitoring the above TSSI results (e.g. the TSSI result TSSI1, the TSSI result TSSI2, and/or the delta TSSI result TSSIDELTA), the digital controller 130 may trigger the re-calibration flow or other associated processing when needed. For example, when the digital controller 130 determines that the change in the output impedance of the transmitting circuit 50 is detected, the digital controller 130 may send a notification message to the transmitting circuit 50 (e.g. to the digital macro 51), and the transmitting circuit 50 (e.g. the digital macro 51) may enable a digital pre-distortion (DPD) calibration flow (e.g. the re-calibration flow, which makes the DPD calibration flow be executed again according to a latest condition such as a latest output impedance of the transmitting circuit 50) in response to the notification message, and thereby ensures that the overall performance of the transmitting circuit 50 can be maintain in a sufficient good level.

Figure 2:
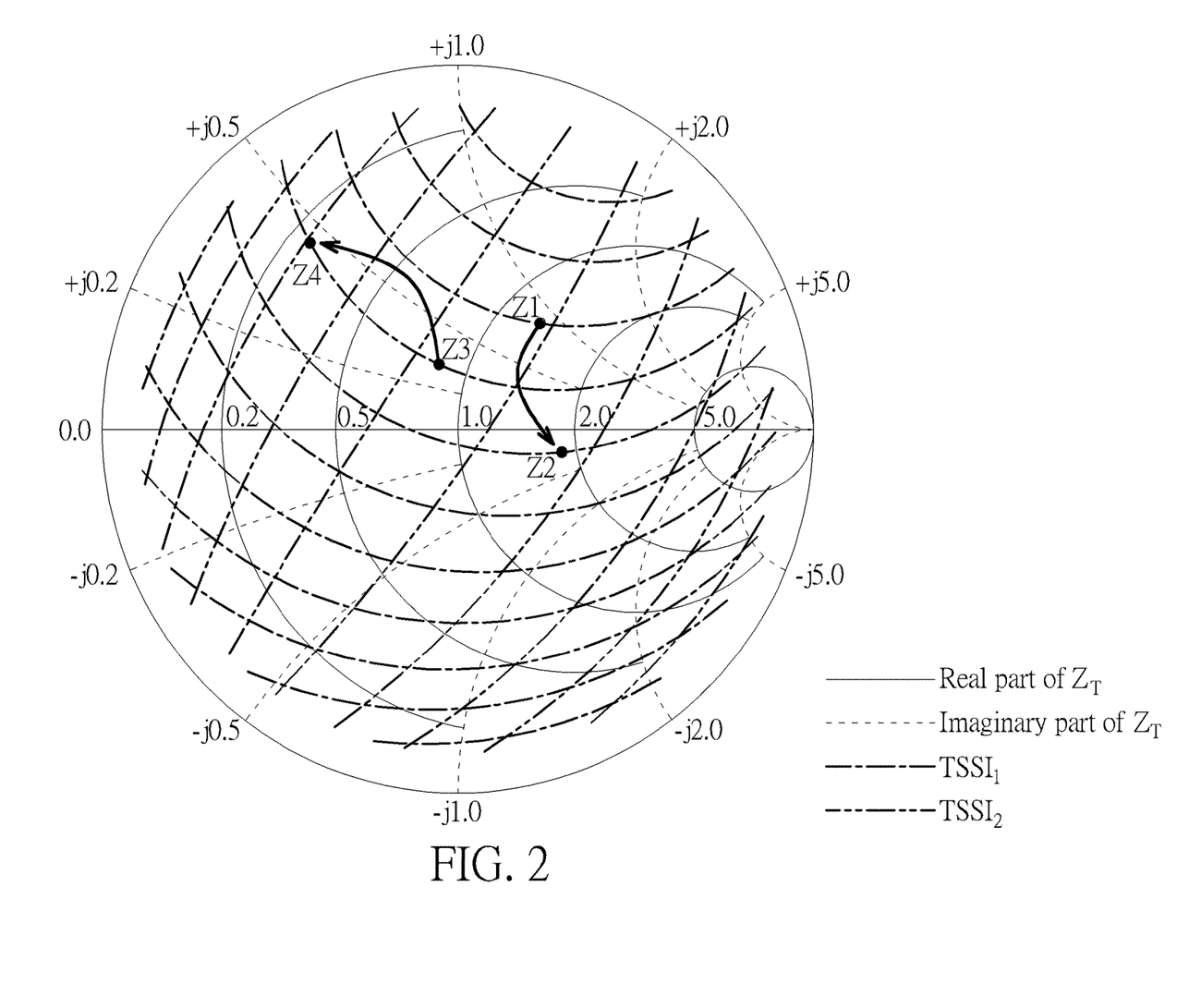
FIG. 2 is a diagram illustrating an impedance Smith chart with corresponding transmitted signal strength indicator results thereon according to an embodiment of the present disclosure.

FIG. 2 is a diagram illustrating an impedance Smith chart (a smith chart illustrating an output impedance $Z_T$ in a complex value format) with corresponding TSSI results thereon according to an embodiment of the present disclosure. In particular, the output impedance $Z_T$ may represent the output impedance of the transmitting circuit 50, where each point on the impedance Smith chart may represent a value of the output impedance $Z_T$ in the complex value format, and the TSSI results $TSSI_1$ and $TSSI_2$ that are obtained under conditions of these values of the output impedance $Z_T$ are depicted on corresponding positions of the impedance Smith chart.

It should be noted that the TSSI result $TSS_1$ may be determined by an absolute value $|V_{S1}|$ of the shifted output voltage $V_{S1}$, an absolute value $|I_{IN}|$ of the input current $I_{IN}$, the gain (also called: amplification factor) A of the amplifier 113, and a phase difference θ between the shifted output voltage $V_{S1}$ and the input current $I_{IN}$ (e.g. $TSS_1 = |V_{S1}| \times |I_{IN}| \times$ $\cos(\theta) \times A$), wherein $|V_{S1}| \times |I_{IN}| \times \cos(\theta) = P_{S1}$, and as mentioned above, in some embodiments, A isn't necessary. The TSSI result $TSSI_2$ may be determined by an absolute value $|V_{S2}|$ of the shifted output voltage $V_{S2}$, the absolute value $|I_{IN}|$ of the input current $I_{IN}$, the gain (also called: amplification factor) B of the amplifier 123, and a phase difference $\alpha$ between the shifted output voltage $V_{S2}$ and the input current $I_{IN}$ (e.g. $TSSI1_1=|V_{S2}| \times |I_{IN}| \times \cos(\alpha) \times B$), wherein $|V_{S2}| \times |I_{IN}| \times \cos(\alpha) = P_{S2}$, and as mentioned above, in some embodiments B isn't necessary. As for the TSSI result $TSSI_1$, the change in the output impedance $Z_T$ may cause a phase deviation (e.g. a change in the phase difference $\theta$) and/or an a gain deviation (e.g. a change in the absolute value $|V_{S1}|$) of the PA 56, and therefore the TSSI result $TSSI_1$ detected by the main TSSI circuit 110 does not always shows different values in response to the change in the output impedance $Z_T$ (e.g. when the absolute value $|V_{S1}|$ is unchanged but the phase difference $\theta$ changes from $\theta_1$ to $-\theta_1$, which results that the TSSI result $TSSI_1$ is unchanged due to $\cos(\theta_1) = \cos(-\theta_1)$). Related descriptions of the TSSI result TSSI2 is similar to that of the TSSI result $TSSI_1$, and is not repeated here for brevity.

In this embodiment, different values of the output impedance $Z_T$ which result a same value of the TSSI result $TSSI_1$ can form a dashed line depicted on the impedance Smith chart shown in FIG. 2, where separated dashed lines may represent different values of the TSSI result $TSSI_1$. Similarly, different values of the output impedance $Z_T$ which result a same value of the TSSI result $TSSI_2$ can form a dashed line depicted on the impedance Smith chart shown in FIG. 2, where separated dashed lines may represent different values of the TSSI result $TSSI_2$. For better comprehension, the TSSI result $TSSI_1$ are depicted with a first type of dashed lines, and the TSSI result $TSSI_1$ are depicted with a second type of dashed lines, as illustrated by the legends.

In some embodiments, the auxiliary TSSI circuit 120 is omitted, which means the digital controller 130 utilizes the TSSI result $TSS_1$ only, for determining whether the output impedance $Z_T$ is changed or not. When the output impedance $Z_T$ is changed from Z1 to Z2, the TSSI result $TSSI_1$ may show different values, which makes the digital controller 130 determines that the change in the output impedance $Z_T$ is detected. However, when the output impedance $Z_T$ is changed from Z3 to Z4, the TSSI result $TSSI_1$ may be unchanged, which makes the digital controller 130 determines that the output impedance $Z_T$ is unchanged.

Thus, the auxiliary TSSI circuit 120 may be utilized for overcome the blind spot of one-dimension TSSI detection mentioned above. In particular, the main TSSI circuit 110 may perform a first-dimension TSSI detection with the first phase shift as illustrated by different values of the TSSI result $TSSI_1$ shown in FIG. 2, and the auxiliary TSSI circuit 120 may perform a second-dimension TSSI detection with the second phase shift as illustrated by different values of the TSSI result $TSSI_2$ shown in FIG. 2. Assume that a certain change in the output impedance $Z_T$ makes the phase difference $\theta$ between the shifted output voltage $V_{S1}$ and the input current $I_{IN}$ changed from $\theta_1$ to $\theta_2$ and makes the phase difference $\alpha$ between the shifted output voltage $V_{S2}$ and the input current $I_{IN}$ changed from $\alpha_1$ to $\alpha_2$, where $TSSI_1(\theta_1)$ represents a value of the TSSI result $TSSI_1$ when $\theta=\theta_1$, $TSSI_1(\theta_2)$ represents a value of the TSSI result $TSSI_1$ when $\theta=\theta_2$, $TSSI_2(\alpha_1)$ represents a value of the TSSI result $TSSI_2$ when $\alpha=\alpha_1$, and $TSSI_2(\alpha_2)$ represents a value of the TSSI result $TSSI_2$ when $\alpha=\alpha_2$. Even if this change in the output impedance $Z_T$ makes $TSSI_1(\theta_1)=TSSI_1(\theta_2)$ (i.e. the value of the TSSI result $TSSI_1$ is unchanged), this change in the output impedance $Z_T$ may still result in a change in the TSSI result $TSSI_2$ (i.e. $TSSI_2(\alpha_1)$ $TSSI_2(\alpha_2)$), making the change in the output impedance $Z_T$ be detectable.

In order to achieve the two-dimension TSSI detection, the first phase shift is set to be different from the second phase shift. In one embodiment, the first phase shift and the second phase shift are set to make the TSSI result $TSSI_2$ be orthogonal to the TSSI result $TSSI_1$ on a smith chart such as the impedance Smith chart shown in FIG. 2. For example, the first phase shift can be set according to requirement of power control for optimizing power level related performance (e.g. adaptively adjusting a power level of a transmitted signal of the transmitting circuit 50 to a target level according to the TSSI result $TSSI_1$) first, and the second phase shift can be accordingly set in order to make the TSSI result $TSSI_2$ be orthogonal to the TSSI result $TSSI_1$ on the Smith chart, but the present disclosure is not limited thereto. In another embodiment, the digital controller 130 may generate the delta TSSI result $TSSI_{DELTA}$ by calculating the difference between the TSSI result $TSSI_1$ and the TSSI result $TSSI_2$ (e.g. $TSSI_{DELTA}=TSSI_1-TSSI_2$), and the first phase shift and the second phase shift are set to make the delta TSSI result $TSSI_{DELTA}$ be orthogonal to the TSSI result $TSSI_1$ on a Smith chart such as the impedance Smith chart shown in FIG. 2. For example, the first phase shift can be set according to requirement of power control for optimizing power level related performance (e.g. adaptively adjusting a power level of a transmitted signal of the transmitting circuit 50 to a target level according to the TSSI result $TSSI_1$) first, and the second phase shift can be accordingly set in order to make the delta TSSI result $TSSI_{DELTA}$ be orthogonal to the TSSI result $TSSI_1$ on the Smith chart, but the present disclosure is not limited thereto.

Figure 3:
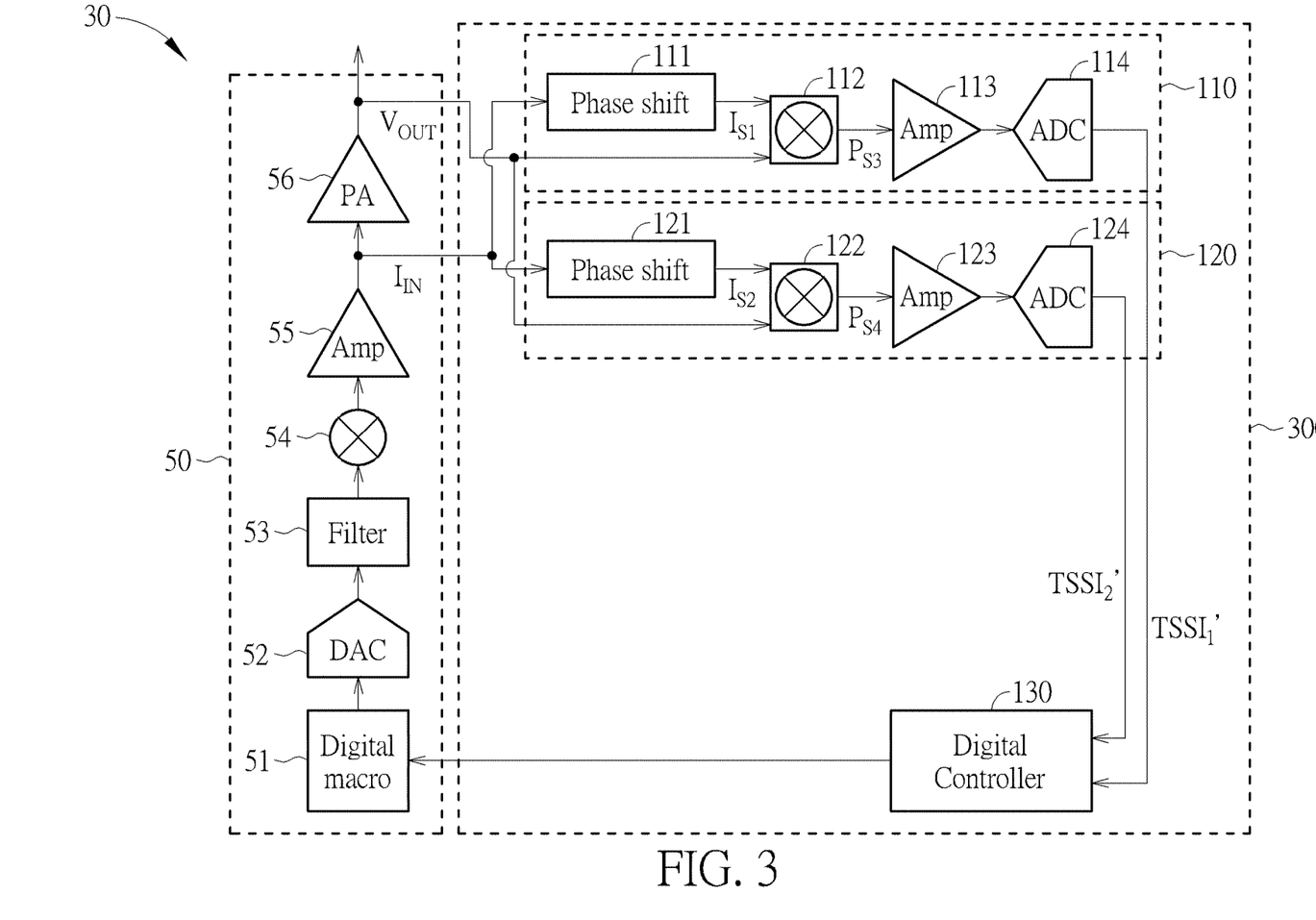
FIG. 3 is a diagram illustrating an electronic device according to another embodiment of the present disclosure.

FIG. 3 is a diagram illustrating an electronic device 30 (e.g. a wireless communication device) according to another embodiment of the present disclosure. As shown in FIG. 3, the difference between the detection circuit 300 shown in FIG. 3 and the detection circuit 100 shown in FIG. 1 is that the phase shifting circuit 111 is configured to apply the first phase shift to the input current $I_{IN}$ of the PA 56 of the transmitting circuit 50 for generating a first shifted input current such as a shifted input current $I_{S1}$, and the multiplier 112 is configured to multiply the shifted input current $I_{S1}$ and the output voltage $V_{OUT}$ of the PA 56 for generating a third power signal such as a power signal $P_{S3}$, wherein the TSSI result $TSSI_1'$ is generated according to the power signal $P_{S3}$. In addition, the phase shifting circuit 121 is configured to apply the second phase shift to the input current $I_{IN}$ of the PA 56 of the transmitting circuit 50 for generating a second shifted input current such as a shifted input current $I_{S2}$, and the multiplier 122 is configured to multiply the shifted input current $I_{S2}$ and the output voltage $V_{OUT}$ of the PA 56 for generating a fourth power signal such as a power signal $P_{S4}$, wherein the TSSI result $TSSI_2'$ is generated according to the power signal $P_{S4}$. In the embodiment of FIG. 3, the TSSI result $TSSI_1'$ may be determined by an absolute value $|V_{OUT}|$ of the output voltage $V_{OUT}$, an absolute value $|I_{S1}|$ of the shifted input current $I_{S1}$, the gain (also called: amplification factor) A of the amplifier 113, and a phase difference $\theta'$ between the shifted input current $I_{S1}$ and the output voltage $V_{OUT}$ (e.g. $TSSI_1'=|V_{OUT}| \times |I_{S1}| \times \cos(\theta') \times A$), wherein $|V_{OUT}| \times |I_{S1}| \times \cos(\theta')=P_{s3}$, and as mentioned above, in some embodiments, A isn't necessary, The TSSI result $TSSI_2'$ may be determined by an absolute value $|V_{OUT}|$ of the output voltage $V_{OUT}$, an absolute value $|I_{S2}|$ of the shifted input current $I_{S2}$, the gain (also called: amplification factor) B of the amplifier 123, and a phase difference $\alpha'$ between the shifted input current $I_{S2}$ and the output voltage $V_{OUT}$ (e.g. $TSSI_2'=|V_{OUT}|\times I_{S2}|\times\cos(\alpha')\times B$), wherein $V_{OUT}|\times|I_{S2}|\times\cos(\alpha')=P_{S4}$, and as mentioned above, in some embodiments, B isn't necessary. As for the TSSI result $TSSI_1'$, the change in the output impedance $Z_T$ may cause a phase deviation (e.g. a change in the phase difference $\theta'$) and/or an a gain deviation (e.g. a change in the absolute value $|V_{OUT}|$). As for the TSSI result $TSSI_2'$, the change in the output impedance $Z_T$ may be caused by a phase deviation (e.g. a change in the phase difference $\alpha'$) and/or an a gain deviation (e.g. a change in the absolute value $|V_{OUT}|$). The remaining operations in this embodiment are the same as that in the embodiment of FIG. 1, and will not be repeated in detail here for brevity.

Figure 4:
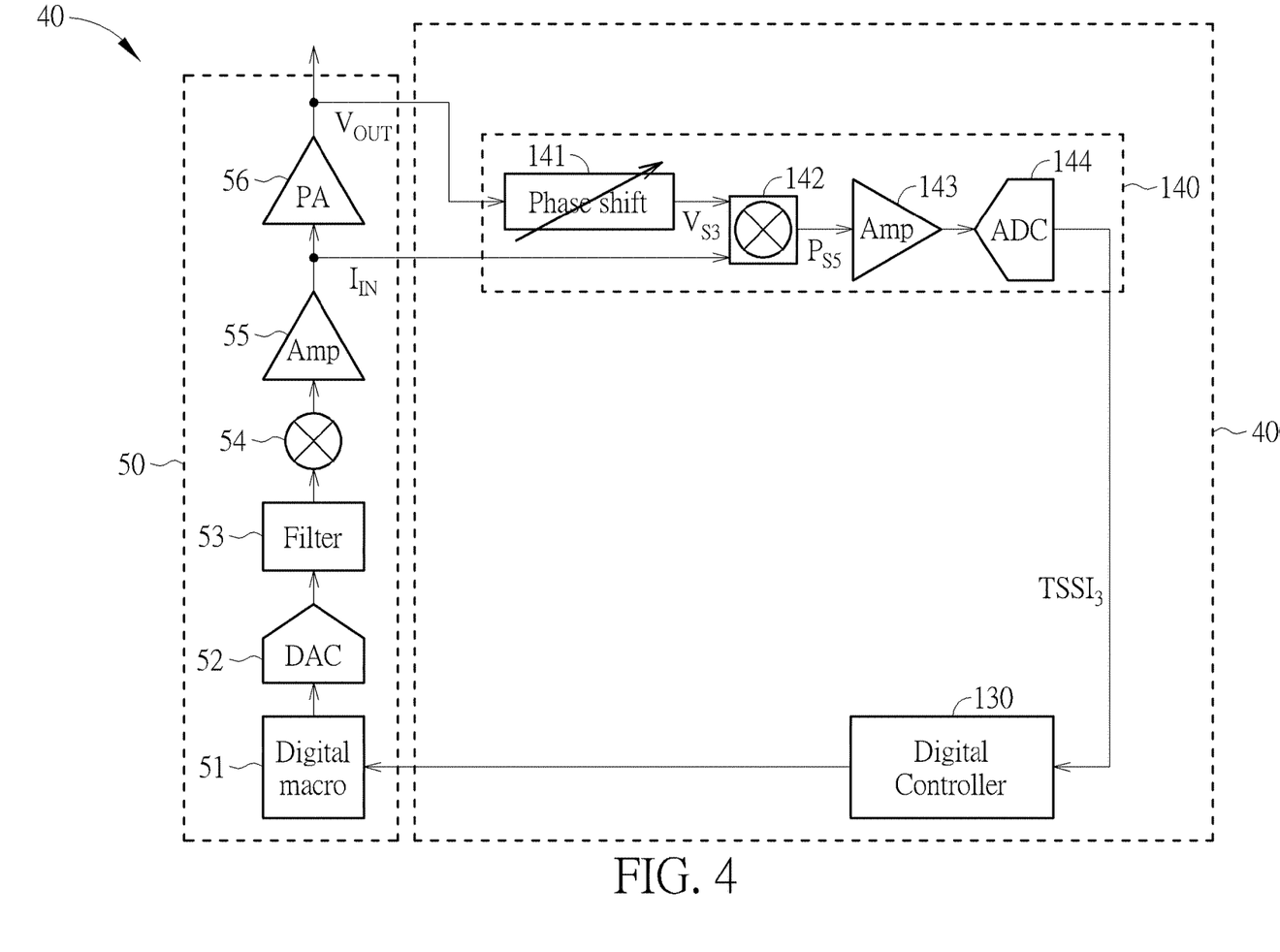
FIG. 4 is a diagram illustrating an electronic device according to another embodiment of the present disclosure.

FIG. 4 is a diagram illustrating an electronic device 40 according to another embodiment of the present disclosure, where the electronic device 40 may comprise the transmitting circuit 50 and a detection circuit 400. As shown in FIG. 4, the detection circuit 400 may comprise at least one TSSI circuit and the digital controller 130. The only difference between the detection circuit 400 shown in FIG. 4 and the detection circuit 100 shown in FIG. 1 is that the at least one TSSI circuit comprises one TSSI circuit only, such as a programmable phase TSSI circuit 140. wherein a programmable phase TSSI circuit 140 is coupled to the digital controller 130. More particularly, the programmable phase TSSI circuit 140 is configured to generate the first TSSI result such as the TSSI result $TSSI_1$ according to a first phase shift and generate the second TSSI result such as the TSSI result $TSSI_2$ according to a second phase shift. In detail, the programmable phase TSSI circuit 140 may comprise a programmable phase shifting circuit 141 (labeled "Phase shift" in FIG. 4 for brevity), a multiplier 142, an amplifier 143 and an ADC 144 (amplifier 143 and ADC 144 could be considered as a TSSI generate circuit). The programmable phase shifting circuit 141 is configured to apply a programmable phase shift to the output voltage $V_{OUT}$ of the PA 56 of the transmitting circuit 50 for generating at least one shifted output voltage such as a shifted output voltage $V_{S3}$, and the multiplier 142 is configured to multiply the output (e.g. a shifted output voltage $V_{S3}$) of the programmable phase shifting circuit 141 and the input current $I_{IN}$ of the PA 56 for generating at least one power signal such as a power signal $P_{S5}$. During a first detection period, the programmable phase shift may be set to the first phase shift to make the programmable phase shifting circuit 141 generate a first shifted output voltage such as the shifted output voltage $V_{S1}$ (e.g. $V_{S3}=V_{S1}$ during the first detection period), the multiplier 142 may multiply the shifted output voltage $V_{S3}$ (e.g. which is equal to $V_{S1}$ during the first detection period) and the input current IN for generating a first power signal $P_{S1}$ (e.g. $P_{S5}=P_{S1}$ during the first detection period), and the TSSI result $TSSI_1$ may be generated according to the power signal $P_{S1}$ (e.g. a TSSI result $TSSI_3$ output from the programmable phase TSSI circuit 140 may be the TSSI result $TSSI_1$ during the first detection period), wherein operations of the amplifier 143 and the ADC 144 during the first detection period are the same as the amplifier 113 and the ADC 114 shown in FIG. 1, and related details are omitted here for brevity. During a second detection period, the programmable phase shift may be set to the second phase shift to make the programmable phase shifting circuit 141 generate a second shifted output voltage such as the shifted output voltage $V_{S2}$ (e.g. $V_{S3}=V_{S2}$ during the second detection period), the multiplier 142 may multiply the shifted output voltage $V_{S3}$ (e.g. which is equal to $V_{S2}$ during the second detection period) and the input current $I_{IN}$ for generating a second power signal $P_{S2}$ (e.g. $P_{S5}=P_{S2}$ during the second detection period), and the TSSI result $TSSI_2$ may be generated according to the power signal $P_{S2}$ (e.g. the TSSI result $TSSI_3$ output from the programmable phase TSSI circuit 140 may be the TSSI result $TSSI_2$ during the second detection period), wherein operations of the amplifier 143 and the ADC 144 during the second detection period are the same as the amplifier 123 and the ADC 124 shown in FIG. 1, and related details are omitted here for brevity. Thus, the present disclosure does not have to utilize two TSSI circuits for achieving the two-dimension TSSI detection mentioned above. By a manner of time division duplexing of the programmable phase TSSI circuit 140, the TSSI results $TSSI_1$ and $TSSI_2$ can be obtained during the first detection period and the second detection period, respectively. The remaining components in the electronic device 40 operate in the same way as that in the electronic device 10 shown in FIG. 1, and will not be repeated in detail here for brevity.

Similarly, in some embodiments, the programmable phase shifting circuit 141 is configured to apply a programmable phase shift to the input current $I_{IN}$ of the PA 56 of the transmitting circuit 50 for generating at least one shifted input current, and the multiplier is configured to multiply the output voltage $V_{OUT}$ of the PA 56 with at least one shifted input current for generating at least one power signal. The remaining operations in these embodiments are the same as that in the embodiment of FIG. 4, and will not be repeated in detail here for brevity.

Figure 5:
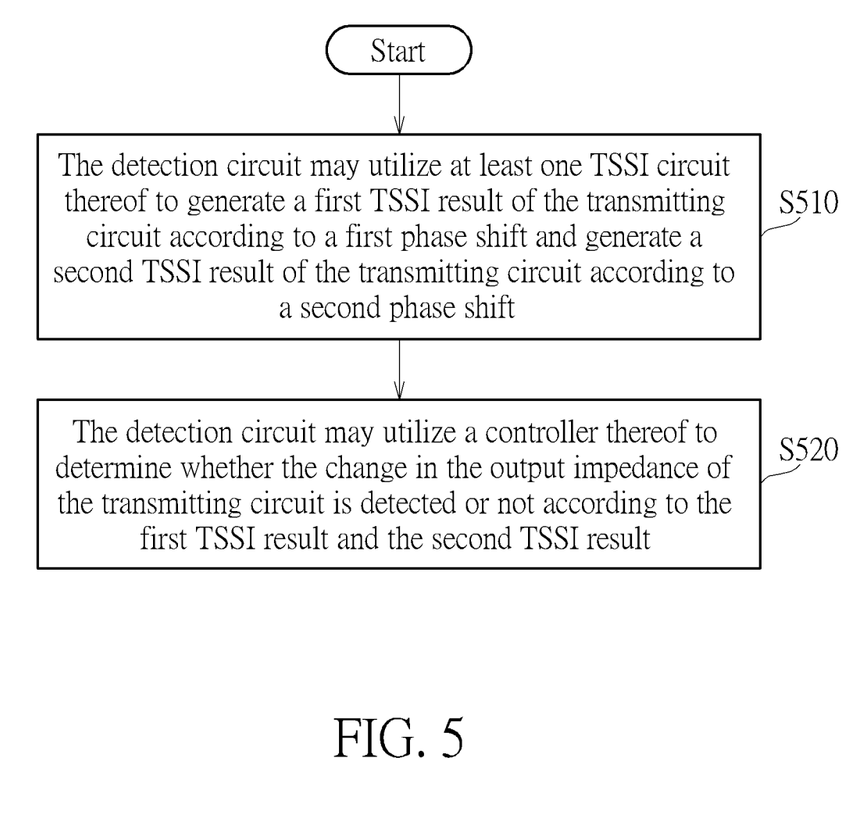
FIG. 5 is a diagram illustrating a working flow of a method for detecting a change in an output impedance of a transmitting circuit according to an embodiment of the present disclosure.

FIG. 5 is a diagram illustrating a working flow of a method for detecting a change in an output impedance of a transmitting circuit according to an embodiment of the present disclosure, where the method is applicable to a detection circuit (e.g. the detection circuit 100 shown in FIG. 1, the detection circuit 300 shown in FIG. 3, or the detection circuit 400 shown in FIG. 4). It should be noted that the working flow shown in FIG. 5 is for illustrative purposes only, and is not meant to be a limitation of the present disclosure. For example, one or more steps may be added, deleted or modified in the working flow shown in FIG. 5. In addition, if a same result can be obtained, these steps do not have to be executed in the exact order shown in FIG. 5.

In Step S510, the detection circuit may utilize at least one TSSI circuit thereof to generate a first TSSI result of the transmitting circuit according to a first phase shift and generate a second TSSI result of the transmitting circuit according to a second phase shift.

In Step S520, the detection circuit may utilize a controller thereof to determine whether the change in the output impedance of the transmitting circuit is detected or not according to the first TSSI result and the second TSSI result.

The details of steps S510-S520 has been described with the electronic device 10 shown in FIG. 1, the electronic device 30 shown in FIG. 3, and the electronic device 40 shown in FIG. 4, and will not be repeated in detail here for brevity.

To summarize, the embodiments of the present disclosure provide two-dimension TSSI detection mechanisms (e.g. by two TSSI circuit respectively equipped with different phase shifting circuits or by one TSSI circuit equipped with one programmable phase shifting circuit), which ensure that any kind of changes in the output impedance (e.g. which resulting in gain deviation or phase deviation) can be detected and thereby trigger required processing such as a re-calibration flow. Thus, the overall performance (such as the EVM) of the transmitting circuit can be maintained at a sufficient good level under various conditions (e.g. a condition where the communication device is held by a user or a condition of being not held by the user). In addition, the embodiments of the present disclosure will not greatly increase additional costs. Thus, the present disclosure can solve the problem of the related art without introducing any side effect or in a way that is less likely to introduce side effects.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A detection circuit for detecting a change in an output impedance of a transmitting circuit, comprising:
    at least one transmitted signal strength indicator (TSSI) circuit, configured to generate a first TSSI result of the transmitting circuit according to a first phase shift, and to generate a second TSSI result of the transmitting circuit according to a second phase shift; and
    a controller, coupled to the at least one TSSI circuit, and configured to determine whether the change in the output impedance of the transmitting circuit is detected or not according to the first TSSI result and the second TSSI result.

2. The detection circuit of claim 1, wherein the at least one TSSI circuit comprises:
    a first TSSI circuit, coupled to the controller, and configured to generate the first TSSI result according to the first phase shift; and
    a second TSSI circuit, coupled to the controller, and configured to generate the second TSSI result according to the second phase shift.

3. The detection circuit of claim 1, wherein the at least one TSSI circuit comprises:
    a programmable phase TSSI circuit, configured to generate the first TSSI result of the transmitting circuit according to the first phase shift, and to generate the second TSSI result of the transmitting circuit according to the second phase shift.

4. The detection circuit of claim 2, wherein:
    the first TSSI circuit comprises a first phase shifting circuit, a first multiplier and a first TSSI generate circuit, the first phase shifting circuit is configured to apply the first phase shift to an output voltage of a power amplifier (PA) of the transmitting circuit for generating a first shifted output voltage, the first multiplier is configured to multiply the first shifted output voltage and an input current of the PA for generating a first power signal, and the first TSSI generate circuit is configured to generate the first TSSI result according to the first power signal; and
    the second TSSI circuit comprises a second phase shifting circuit, a second multiplier and a second TSSI generate circuit, the second phase shifting circuit is configured to apply the second phase shift to the output voltage for generating a second shifted output voltage, the second multiplier is configured to multiply the second shifted output voltage and the input current for generating a second power signal, and the second TSSI generate circuit is configured to generate the second TSSI result according to the second power signal.

5. The detection circuit of claim 3, wherein the programmable phase TSSI circuit comprises:
    a programmable phase shifting circuit, configured to apply a programmable phase shift to an output voltage of a power amplifier (PA) of the transmitting circuit;
    a multiplier, configured to multiply an output of the programmable phase shifting circuit and an input current of the PA; and
    a TSSI generate circuit;
    wherein:
        during a first detection period, the programmable phase shift is set to the first phase shift to make the programmable phase shifting circuit generate a first shifted output voltage, the multiplier multiplies the first shifted output voltage and the input current for generating a first power signal, and the TSSI generate circuit is configured to generate the first TSSI result according to the first power signal; and
        during a second detection period, the programmable phase shift is set to the second phase shift to make the programmable phase shifting circuit generate a second shifted output voltage, the multiplier multiplies the second shifted output voltage and the input current for generating a second power signal, and the TSSI generate circuit is configured to generate the second TSSI result according to the second power signal.

6. The detection circuit of claim 2, wherein:
    the first TSSI circuit comprises a first phase shifting circuit, a first multiplier and a first TSSI generate circuit, the first phase shifting circuit is configured to apply the first phase shift to an input current of a power amplifier (PA) of the transmitting circuit for generating a first shifted input current, the first multiplier is configured to multiply the first shifted input current and an output voltage of the PA for generating a first power signal, and the first TSSI generate circuit is configured to generate the first TSSI result according to the first power signal; and
    the second TSSI circuit comprises a second phase shifting circuit, a second multiplier and a second TSSI generate circuit, the second phase shifting circuit is configured to apply the second phase shift to the input current for generating a second shifted input current, the second multiplier is configured to multiply the second shifted input current and the output voltage for generating a second power signal, and the second TSSI generate circuit is configured to generate the second TSSI result according to the second power signal.

7. The detection circuit of claim 3, wherein the programmable phase TSSI circuit comprises:
    a programmable phase shifting circuit, configured to apply a programmable phase shift to an input current of a power amplifier (PA) of the transmitting circuit;
    a multiplier, configured to multiply an output of the programmable phase shifting circuit and an output voltage of the PA; and
    a TSSI generate circuit;
    wherein:
        during a first detection period, the programmable phase shift is set to the first phase shift to make the programmable phase shifting circuit generate a first shifted input current, the multiplier multiplies the first shifted input current and the output voltage for generating a first power signal, and the TSSI generate circuit is configured to generate the first TSSI result according to the first power signal; and
        during a second detection period, the programmable phase shift is set to the second phase shift to make the programmable phase shifting circuit generate a second shifted input current, the multiplier multiplies the second shifted input current and the output voltage for generating a second power signal, and the TSSI generate circuit is configured to generate the second TSSI result according to the second power signal.

8. The detection circuit of claim 1, wherein when a change in any of the first TSSI result and the second TSSI result is greater than a predetermined threshold, the controller is configured to determine that the change in the output impedance of the transmitting circuit is detected.

9. The detection circuit of claim 1, wherein the controller is configured to generate a delta TSSI result by calculating a difference between the first TSSI result and the second TSSI result, and when a change in any of the first TSSI result and the delta TSSI result is greater than a predetermined threshold, the controller is configured to determine that the change in the output impedance of the transmitting circuit is detected.

10. The detection circuit of claim 1, wherein the first phase shift and the second phase shift are set to make the second TSSI result be orthogonal to the first TSSI result on a Smith chart.

11. The detection circuit of claim 1, wherein the controller is configured to generate a delta TSSI result by calculating a difference between the first TSSI result and the second TSSI result, and the first phase shift and the second phase shift are set to make the delta TSSI result be orthogonal to the first TSSI result on a Smith chart.

12. A method for detecting a change in an output impedance of a transmitting circuit, applicable to a detection circuit, the method comprising:
utilizing at least one transmitted signal strength indicator (TSSI) circuit of the detection circuit to generate a first TSSI result of the transmitting circuit according to a first phase shift and generate a second TSSI result of the transmitting circuit according to a second phase shift; and
utilizing a controller of the detection circuit to determine whether the change in the output impedance of the transmitting circuit is detected or not according to the first TSSI result and the second TSSI result.

13. The method of claim 12, wherein utilizing the at least one TSSI circuit of the detection circuit to generate the first TSSI result of the transmitting circuit according to the first phase shift and generate the second TSSI result of the transmitting circuit according to the second phase shift comprises:
utilizing a first TSSI circuit of the at least one TSSI circuit to generate the first TSSI result according to the first phase shift and utilizing a second TSSI circuit of the at least one TSSI circuit to generate the second TSSI result according to the second phase shift.

14. The method of claim 12, wherein utilizing the at least one TSSI circuit of the detection circuit to generate the first TSSI result of the transmitting circuit according to the first phase shift and generate the second TSSI result of the transmitting circuit according to the second phase shift comprises:
utilizing a programmable phase TSSI circuit to generate the first TSSI result of the transmitting circuit according to the first phase shift and generate the second TSSI result of the transmitting circuit according to the second phase shift.

15. The method of claim 13, wherein utilizing the first TSSI circuit to generate the first TSSI result according to the first phase shift comprises:
utilizing a first phase shifting circuit of the first TSSI circuit to apply the first phase shift to an output voltage of a power amplifier (PA) of the transmitting circuit for generating a first shifted output voltage;
utilizing a first multiplier of the first TSSI circuit to multiply the first shifted output voltage and an input current of the PA for generating a first power signal;
utilizing a first TSSI generate circuit to generate the first TSSI result according to the first power signal;
wherein utilizing the second TSSI circuit to generate the second TSSI result according to the second phase shift comprises:
utilizing a second phase shifting circuit of the second TSSI circuit to apply the second phase shift to the output voltage for generating a second shifted output voltage;
utilizing a second multiplier of the second TSSI circuit to multiply the second shifted output voltage and the input current for generating a second power signal; and
utilizing a second TSSI generate circuit to generate the second TSSI result according to the second power signal.

16. The method of claim 14, wherein utilizing the programmable phase TSSI circuit to generate the first TSSI result of the transmitting circuit according to the first phase shift and generate the second TSSI result of the transmitting circuit according to the second phase shift comprises:
during a first detection period, utilizing a programmable phase shifting circuit of the at least one TSSI circuit to apply the first phase shift to an output voltage of a power amplifier (PA) of the transmitting circuit for generating a first shifted output voltage;
during the first detection period, utilizing a multiplier of the at least one TSSI circuit to multiply the first shifted output voltage and an input current of the PA for generating a first power signal;
during the first detection period, utilizing a TSSI generate circuit to generate the first TSSI result according to the first power signal;
during a second detection period, utilizing the programmable phase shifting circuit to apply the second phase shift to the output voltage for generating a second shifted output voltage;
during the second detection period, utilizing the multiplier to multiply the second shifted output voltage and the input current for generating a second power signal; and
during the second detection period, utilizing the TSSI generate circuit to generate the second TSSI result according to the second power signal.

17. The method of claim 13, wherein utilizing the first TSSI circuit to generate the first TSSI result according to the first phase shift comprises:
utilizing a first phase shifting circuit of the first TSSI circuit to apply the first phase shift to an input current of a power amplifier (PA) of the transmitting circuit for generating a first shifted input current;
utilizing a first multiplier of the first TSSI circuit to multiply the first shifted input current and an output voltage of the PA for generating a first power signal;
utilizing a first TSSI generate circuit to generate the first TSSI result according to the first power signal;
wherein utilizing the second TSSI circuit to generate the second TSSI result according to the second phase shift comprises:
utilizing a second phase shifting circuit of the second TSSI circuit to apply the second phase shift to the input current for generating a second shifted input current;

utilizing a second multiplier of the second TSSI circuit to multiply the second shifted input current and the output voltage for generating a second power signal; and utilizing a second TSSI generate circuit to generate the second TSSI result according to the second power signal.

18. The method of claim 14, wherein utilizing the programmable phase TSSI circuit to generate the first TSSI result of the transmitting circuit according to the first phase shift and generate the second TSSI result of the transmitting circuit according to the second phase shift comprises:

during a first detection period, utilizing a programmable phase shifting circuit of the at least one TSSI circuit to apply the first phase shift to an input current of a power amplifier (PA) of the transmitting circuit for generating a first shifted input current;

during the first detection period, utilizing a multiplier of the at least one TSSI circuit to multiply the first shifted input current and an output voltage of the PA for generating a first power signal;

during the first detection period, utilizing a TSSI generate circuit to generate the first TSSI result according to the first power signal;

during a second detection period, utilizing the programmable phase shifting circuit to apply the second phase shift to the input current for generating a second shifted input current; and during the second detection period, utilizing the multiplier to multiply the second shifted input current and the output voltage for generating a second power signal; and during the second detection period, utilizing the TSSI generate circuit to generate the second TSSI result according to the second power signal.

19. The method of claim 12, wherein utilizing the controller of the detection circuit to determine whether the change in the output impedance of the transmitting circuit is detected or not according to the first TSSI result and the second TSSI result comprises:

in response to a change in any of the first TSSI result and the second TSSI result being greater than a predetermined threshold, utilizing the controller to determine that the change in the output impedance of the transmitting circuit is detected.

20. The method of claim 12, wherein a delta TSSI result is generated by calculating a difference between the first TSSI result and the second TSSI result, and utilizing the controller of the detection circuit to determine whether the change in the output impedance of the transmitting circuit is detected or not according to the first TSSI result and the second TSSI result comprises:

in response to a change in any of the first TSSI result and the delta TSSI result being greater than a predetermined threshold, utilizing the controller to determine that the change in the output impedance of the transmitting circuit is detected.

* * * * *